No. 622,423. Patented Apr. 4, 1899.
W. & W. E. GREIG.
APPARATUS FOR PURIFYING EFFLUENT WATERS.
(Application filed July 7, 1898.)
(No Model.)
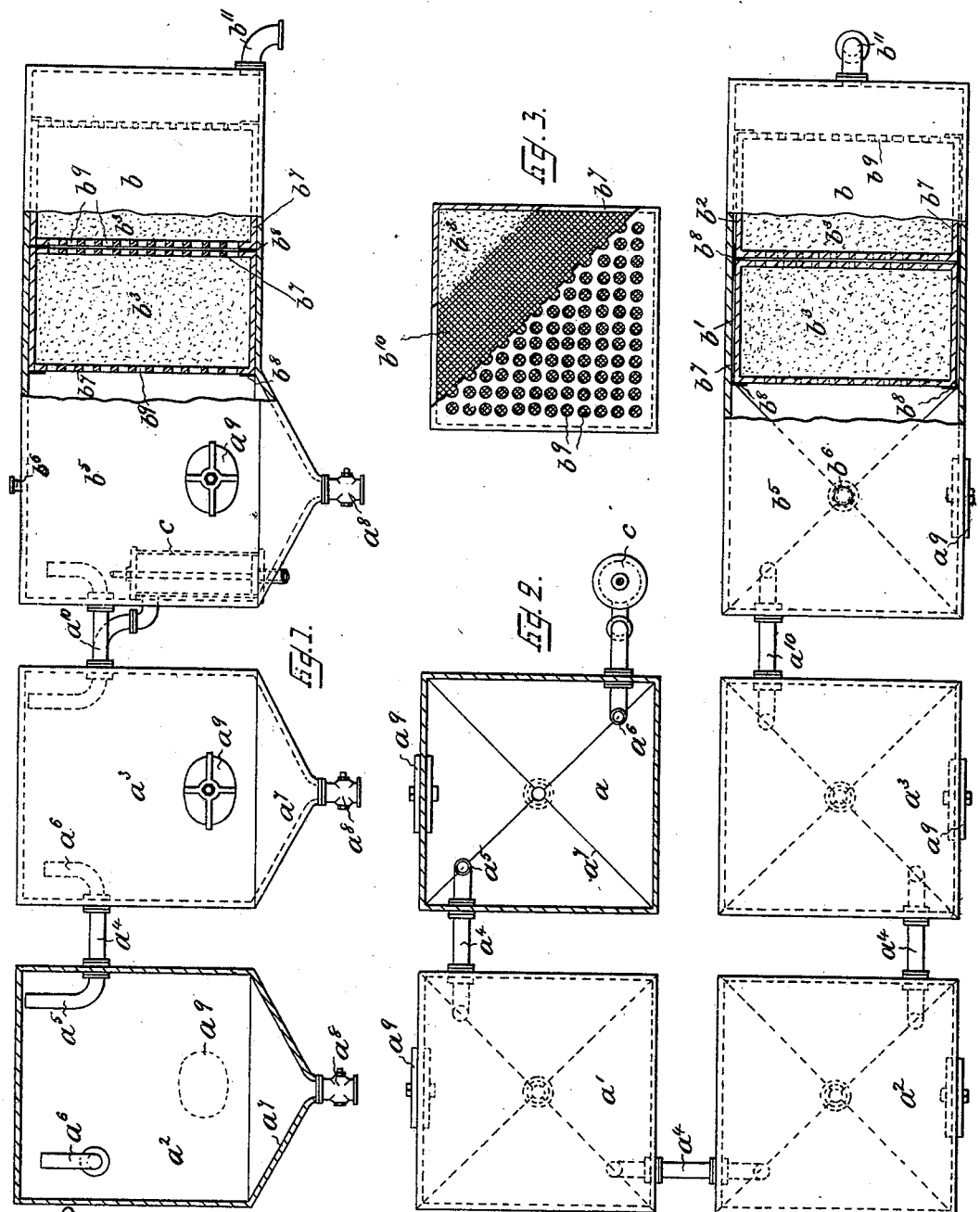
Witnesses:
Inventors:
William Greig,
William Edward Greig,
by Alexis K. Alexander,
Attorney.

UNITED STATES PATENT OFFICE.

WILLIAM GREIG AND WILLIAM EDWARD GREIG, OF DARTFORD, ENGLAND.

APPARATUS FOR PURIFYING EFFLUENT WATERS.

SPECIFICATION forming part of Letters Patent No. 622,423, dated April 4, 1899.

Application filed July 7, 1898. Serial No. 685,324. (No model.)

*To all whom it may concern:*

Be it known that we, WILLIAM GREIG and WILLIAM EDWARD GREIG, subjects of the Queen of Great Britain and Ireland, and residents of Dartford, Kent, England, have invented certain new and useful Improved Means of Purifying the Effluent Waters of Factories and the Like, also River-Water and Sewage, (for which we have applied for British Patent No. 29,070, dated December 8, 1897,) of which the following is a specification.

This invention relates to improved means of purifying the effluent water of paper-mills, tanneries, chemical-works, ink-making works, dye-works, and other factories and the like, also river-water and sewage, (hereinafter referred to as the "effluent,") to the extent of decolorizing and deodorizing the same, removing the coloring and noxious-smelling matters and all fibrous and other matters in suspension, and causing the water to issue from the apparatus colorless, clear, and inodorous and fit to mingle with or return to running streams of water.

On the accompanying drawings, Figure 1 represents an elevation, partly in section, of the improved apparatus. Fig. 2 represents a plan, partly in section, and Fig. 3 represents a side elevation, partly in section, of one of the removable filter-medium receptacles, hereinafter referred to.

To the end aforesaid the invention consists in the use, in combination, of a connected series (of any required number) of closed settling or sediment chambers $a\ a'\ a^2\ a^3$, with a closed filtering-chamber $b$, containing any required number of compartments $b'\ b^2$, serving to receive removable receptacles $b^7$, charged with ashes $b^3$ as the filtering medium and which may be coarse or fine, according to the particular industrial application of the invention, and with means of forcing the effluent to be purified through the apparatus under pressure, as hereinafter more fully described.

The chambers $a\ a'\ a^2\ a^3$ are placed in continuous connection by means of pipes $a^4$, the legs of which are upturned to prevent washing out of the sediment, the outlet-leg $a^5$ of each pipe being arranged at a higher level than that of its inlet-leg $a^6$ to take off the filtrate at its clearest part.

Each of the settling-chambers is made with an inclined hopper-like sediment-collecting bottom $a^7$, formed with an outlet provided with a sludge-cock $a^8$, and is also provided with a manhole $a^9$ for facilitating access to its interior for any necessary purpose. The first of the series of such chambers is connected to a pump $c$ or other convenient means of forcing the effluent to be purified under a sufficient pressure or head into and through the apparatus, the last of the series of such chambers being connected by a pipe $a^{10}$ (similar in arrangement to that of the pipes $a^4$) to the filtering-chamber $b$, which also is made with a sediment-collecting chamber $b^5$, similarly formed and adapted to those $a$ to $a^3$, hereinbefore described, and is fitted with a valve $b^6$, serving to relieve any accumulation and excess of pressure in the filtering-chamber of air carried over by the filtrate.

The filtering-chamber may be made of any required extent, according to the particular industrial application of the apparatus, and with any required number of compartments $b'\ b^2$, each of which is fitted with a receptacle $b^7$, adapted and serving to contain the filtering-ashes $b^3$, which are closely packed therein, the receptacles being respectively removable from the compartments of the chamber $b$ and being located therein by vertical guides $b^8$. The adjacent sides of the receptacles are adapted to retain the ashes and yet to permit of the through passage of the filtrate by being formed with perforations $b^9$, covered with fine-meshed wire $b^{10}$.

The settling and filtering chambers may respectively be made of wood, or of iron, or of other suitable metal or material, the top of the filtering-chamber being so constructed that it may be opened to permit of the ash-receptacles $b^7$ being removed when charged with the arrested matters and replaced charged with fresh ashes.

The settling-chambers serve to arrest the coarse matters in suspension in the filtrate which gravitate therein, and the filtering-chamber serves by the filtering action of the ashes in arresting the finer or float matters in suspension therein to complete the required purification of the effluent, by which combined action the filtrate is caused to issue from the apparatus by an outlet pipe or pipes $b^{11}$, decolorized, deodorized, and fit to return to or mingle with running streams of water without liability of polluting the same.

What we claim as our invention, and desire to secure by Letters Patent, is—

1. In filtering apparatus, the combination with means for forcing the effluent to be purified, of a series of closed settling-chambers each having a hopper-bottom with a sludge-cock at its lowest point, pipes connecting said chambers, having upturned legs, the outlet-leg being at a higher level than the inlet-leg, and a filtering-chamber into which the effluent finally passes, substantially as described.

2. In filtering apparatus, a sediment-collecting chamber provided with a hopper-bottom having a sludge-cock at its lowest point and an air-escape valve in its top, a lateral extension of said chamber on one side serving as a filtering-chamber, vertical guides in said extension, and one or more receptacles fitting between said guides and filled with ashes, said receptacles having perforated sides covered on the inside with wire-gauze, substantially as described.

Signed at Gravesend, Kent, England, this 22d day of June, 1898.

WILLIAM GREIG.
WILLIAM EDWARD GREIG.

Witnesses:
SAMUEL ROBERT MACARTNEY,
C. C. COUVES.